(12) United States Patent
Wung

(10) Patent No.: US 10,160,527 B2
(45) Date of Patent: Dec. 25, 2018

(54) DIVING GOGGLES HAVING DETACHABLE CAMERA BRACKET

(71) Applicant: Dongguan Longwell Sports Co., Ltd., Dongguan (CN)

(72) Inventor: Chin-Hsien Wung, Dongguan (CN)

(73) Assignee: DONGGUAN LONGWELL SPORTS CO., LTD., Dongguan, Guangdong (CN)

( * ) Notice: Subject to any disclaimer, the term of this patent is extended or adjusted under 35 U.S.C. 154(b) by 55 days.

(21) Appl. No.: 15/413,368

(22) Filed: Jan. 23, 2017

(65) Prior Publication Data
US 2018/0208281 A1 Jul. 26, 2018

(51) Int. Cl.
B63C 11/12 (2006.01)
G03B 17/56 (2006.01)

(52) U.S. Cl.
CPC ............ B63C 11/12 (2013.01); G03B 17/561 (2013.01); G03B 17/566 (2013.01)

(58) Field of Classification Search
CPC ........ A63B 33/00; F16M 13/04; B63C 11/12; G03B 17/566; G03B 17/561
USPC ........ 248/205.1, 229.1, 229.2, 226.11, 227.1
See application file for complete search history.

(56) References Cited

U.S. PATENT DOCUMENTS

| | | | | |
|---|---|---|---|---|
| 5,479,917 A * | 1/1996 | Hsieh | ...................... | B63C 11/12 128/200.29 |
| 5,638,552 A * | 6/1997 | Fujima | ................... | B63C 11/12 2/428 |
| 5,642,529 A * | 7/1997 | Fujima | ................... | B63C 11/12 128/200.29 |
| 8,845,093 B1 * | 9/2014 | Shieh | ..................... | B63C 11/12 2/441 |
| 9,864,258 B1 * | 1/2018 | McVicker | ............. | G03B 17/08 |
| 2008/0087784 A1 * | 4/2008 | Holmberg | ............. | F16M 13/00 248/309.1 |
| 2008/0192114 A1 * | 8/2008 | Pearson | ................. | G03B 17/08 348/81 |
| 2010/0142036 A1 * | 6/2010 | Sterns | .................... | G02B 23/16 359/363 |
| 2011/0280566 A1 * | 11/2011 | Cherubin | ............ | F16M 11/048 396/428 |
| 2014/0027591 A1 * | 1/2014 | Fountain | ................ | F16M 13/04 248/226.11 |
| 2015/0286116 A1 * | 10/2015 | Johnson, Sr. | ........ | G03B 17/568 348/373 |
| 2015/0316205 A1 * | 11/2015 | Bennett | .................. | F16M 13/00 224/181 |
| 2016/0271454 A1 * | 9/2016 | Lo | ........................ | A63B 33/002 |
| 2017/0021901 A1 * | 1/2017 | Phillipp, Jr. | ............ | B63C 11/12 |
| 2017/0108759 A1 * | 4/2017 | Clearman | ............. | F16M 11/04 |
| 2017/0274969 A1 * | 9/2017 | Lin | ......................... | B63C 11/12 |

(Continued)

*Primary Examiner* — Muhammad Ijaz
(74) *Attorney, Agent, or Firm* — Leong C. Lei

(57) ABSTRACT

Diving goggles having a detachable camera bracket includes a frame, a pair of lenses, and a mask. The lenses and the mask are mounted to the frame. The camera bracket is detachably mounted on the frame. A lower end of the camera bracket is secured to the frame by means of clipping and hooking, and an upper end of the camera bracket is provided with a retaining seat for mounting a camera. The camera bracket connects the camera with the frame stably. During diving, the diver can take a picture for the underwater scenery conveniently, enhancing the diving entertainment.

5 Claims, 6 Drawing Sheets

(56) References Cited

U.S. PATENT DOCUMENTS

2017/0307136 A1\* 10/2017 Wei .................... F16M 11/12
2017/0315428 A1\* 11/2017 Johnson, Sr. .......... G03B 37/02
2018/0015990 A1\* 1/2018 Godoy ................. B63C 11/12

\* cited by examiner

A-A

DIVING GOGGLES HAVING DETACHABLE CAMERA BRACKET

FIELD OF THE INVENTION

The present invention relates to a diving gear, and more particularly to diving goggles having a detachable camera bracket.

BACKGROUND OF THE INVENTION

Diving goggles are used for water sports, snorkeling and diving. The main function of diving goggles is used to protect the user's eyes from water, so that the user can see the underwater objects clearly. Moreover, in many cases, due to the needs of the work or entertainment, it is necessary to take pictures for the underwater scenery. The traditional approach is to carry a camera for shooting while diving. This is inconvenient. In order to solve this problem, goggles with a bracket for retaining a camera is developed. The structure of the bracket is not stable. During diving, the camera is vulnerable to water flow to shake, affecting the shooting effect. Accordingly, the inventor of the present invention has devoted himself based on his many years of practical experiences to solve these problems.

SUMMARY OF THE INVENTION

In view of the shortcomings of the prior art, the primary object of the present invention is to provide diving goggles having a detachable camera bracket. A lower end of the camera bracket is secured to a frame of the diving goggles by means of clipping and hooking, and an upper end of the camera bracket is provided with a retaining seat for mounting a camera. The camera bracket connects the camera with the frame stably. During diving, the diver can take a picture for the underwater scenery conveniently, enhancing the diving entertainment.

In order to achieve the aforesaid object, the diving goggles having a detachable camera bracket of the present invention comprises a frame, a pair of lenses, and a mask for attaching to a wearer's face. The lenses are mounted to an outer side of the frame. The mask is mounted to an inner side of the frame. The camera bracket is detachably mounted on the frame for retaining a camera. The camera bracket includes a coupling seat for coupling with the frame and a retaining seat on top of the coupling seat for retaining the camera. The coupling seat includes a top plate and a side plate extending downward from a rear side of the top plate. A front end of the top plate is bent downward to form a limit block. A retaining space is defined between the limit block and the side plate for retaining an upper edge of the frame. A lower surface of the top plate is provided with an engaging buckle facing downward. A lower end of the side plate is provided with an L-shaped hook. The upper edge of the frame has an engaging recess corresponding to the engaging buckle. A front side wall of the frame has an upright recess corresponding to the hook. The engaging buckle is engaged with the engaging recess. The hook is engaged with the upright recess.

Preferably, the coupling seat is provided with a rib extending downward from the lower surface of the top plate to the lower end of the side plate. The engaging buckle is disposed at an upper end of the rib. The hook is disposed at a lower end of the rib. The frame has a groove corresponding to the rib. The rib is engaged in the groove. The engaging recess is disposed at an upper end of the groove. The upright recess is disposed at a lower end of the groove.

Preferably, an inner wall of the retaining space is formed with a positioning groove. An outer wall of the frame is provided with a positioning rib corresponding to the positioning groove. The positioning rib is engaged in the positioning groove.

Preferably, the inner wall of the retaining space is formed with two positioning grooves. The two positioning grooves are located at two sides of the engaging buckle and extend from the lower surface of the top plate to an inner wall of the side plate. The frame is provided with two positioning ribs corresponding to the two positioning grooves and extending downward from the upper edge of the frame to the front side wall of the frame.

Preferably, the retaining seat includes a plurality of support plates which are vertically arranged side by side and disposed on an outer wall of the top plate. The support plates each have a retaining through hole therein.

Preferably, the plurality of support plates are integrally disposed on an upper surface of the top plate.

Compared to the prior art, the present invention has obvious advantages and beneficial effects. Specifically, the camera bracket is detachably mounted on the frame of the diving goggles, and the lower end of the camera bracket is secured to the frame by means of clipping and hooking, and the upper end of the camera bracket is provided with the retaining seat for mounting the camera. The camera bracket connects the camera with the frame stably, effectively preventing the camera from shaking during diving. Thus, during diving, the diver can take a picture for the underwater scenery very conveniently. Diving and photographing can be achieved at the same time. The camera bracket can be removed conveniently when it is necessary to take a picture. The present invention enhances the diving entertainment.

DETAILED DESCRIPTION OF THE PREFERRED EMBODIMENTS

Embodiments of the present invention will now be described, by way of example only, with reference to the accompanying drawings.

Figure 1:
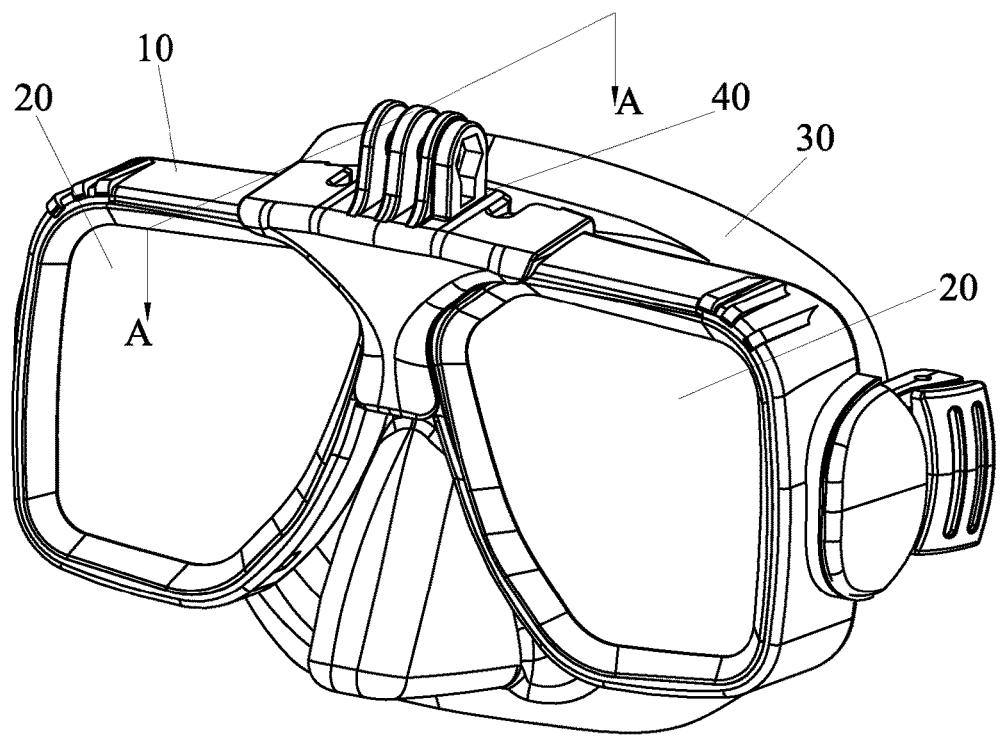
FIG. 1 is a perspective view of the present invention.
Figure 2:
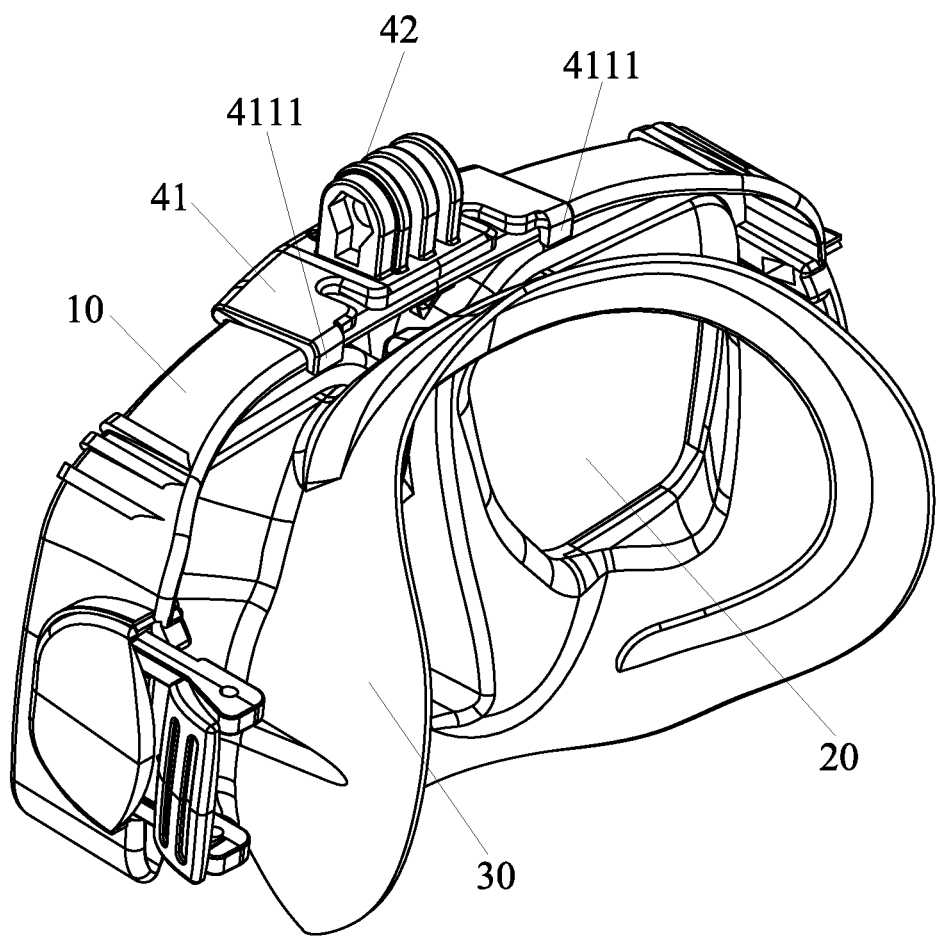
FIG. 2 is another perspective view of the present invention, seen from another angle.
Figure 3:
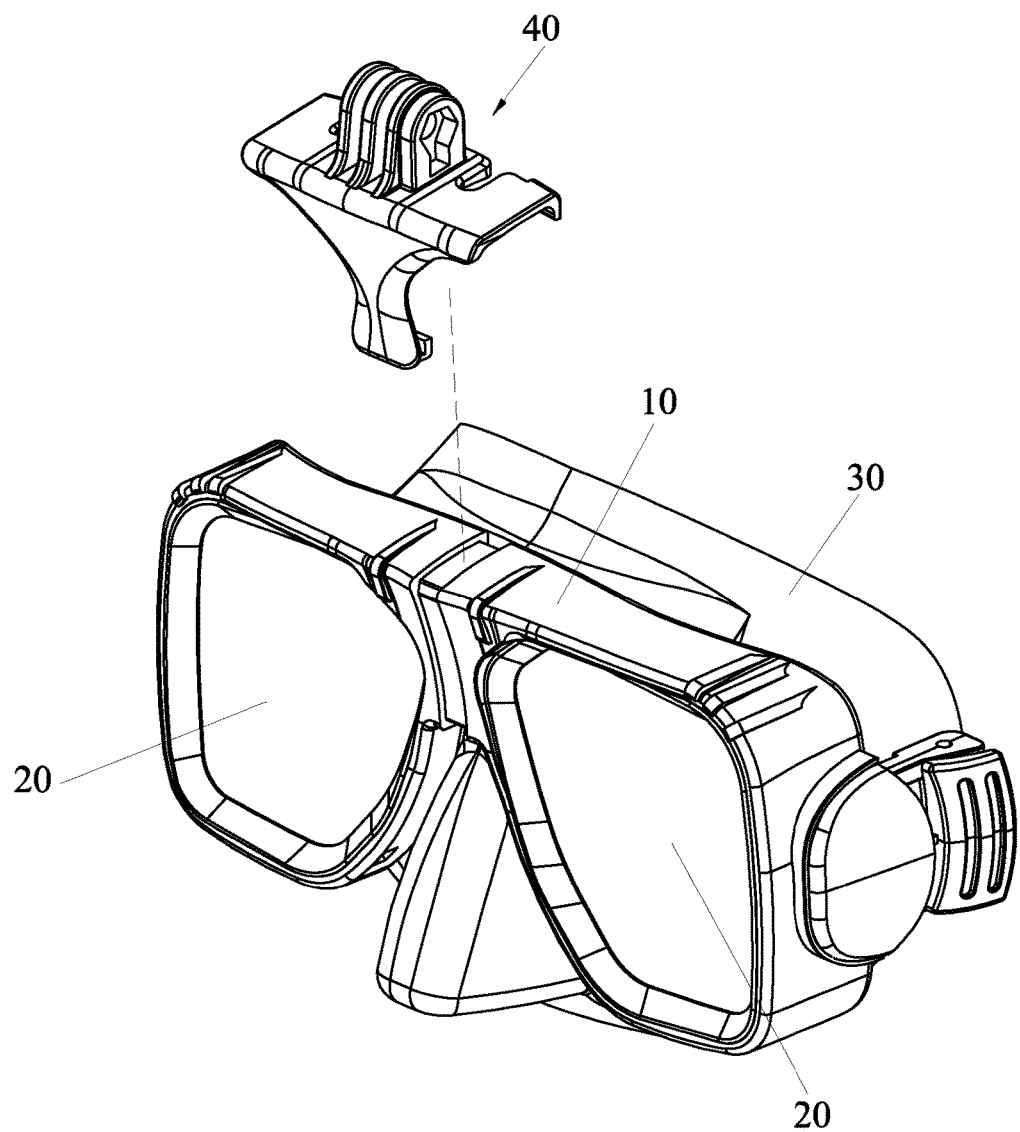
FIG. 3 is an exploded view of the camera bracket and the frame of the present invention.
Figure 4:
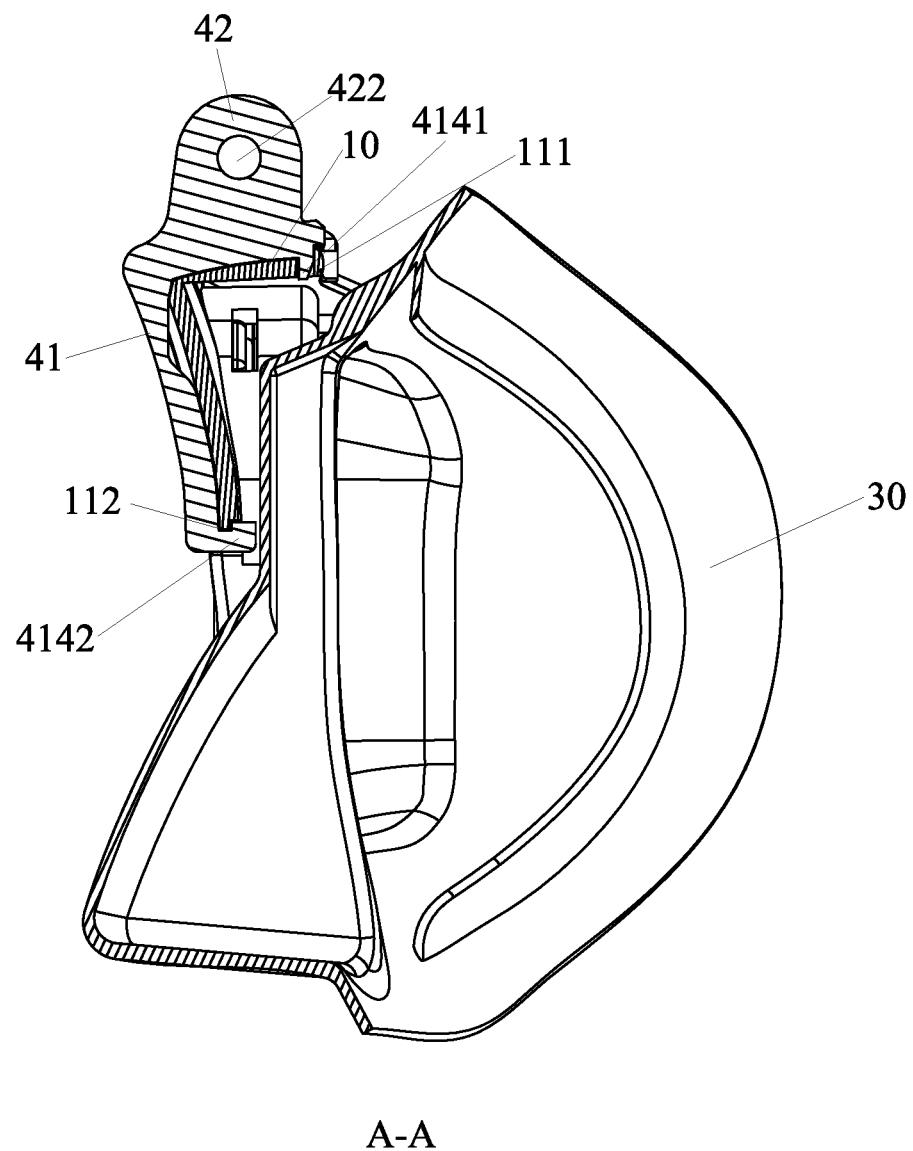
FIG. 4 is a sectional view taken along line A-A of FIG. 1.
Figure 5:
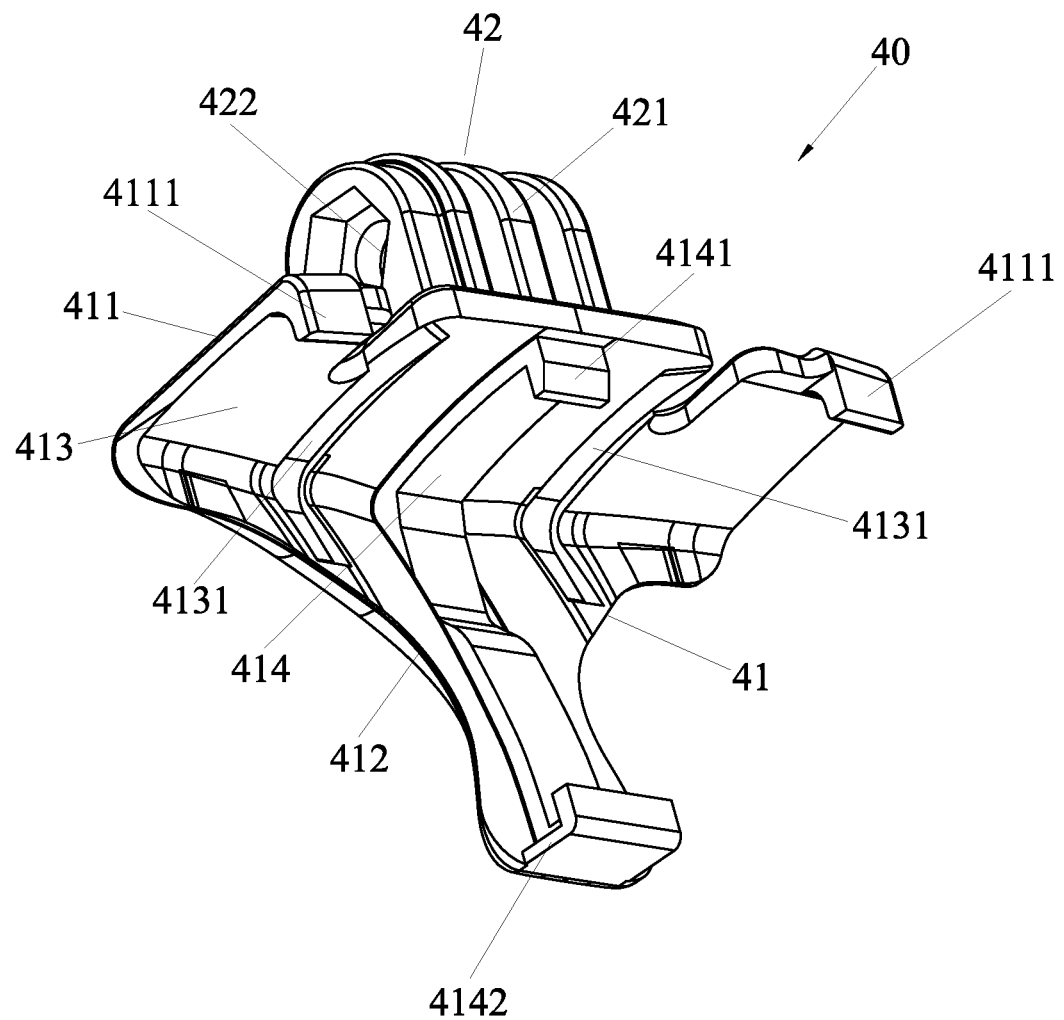
FIG. 5 is a perspective view of the camera bracket of the present invention.
Figure 6:
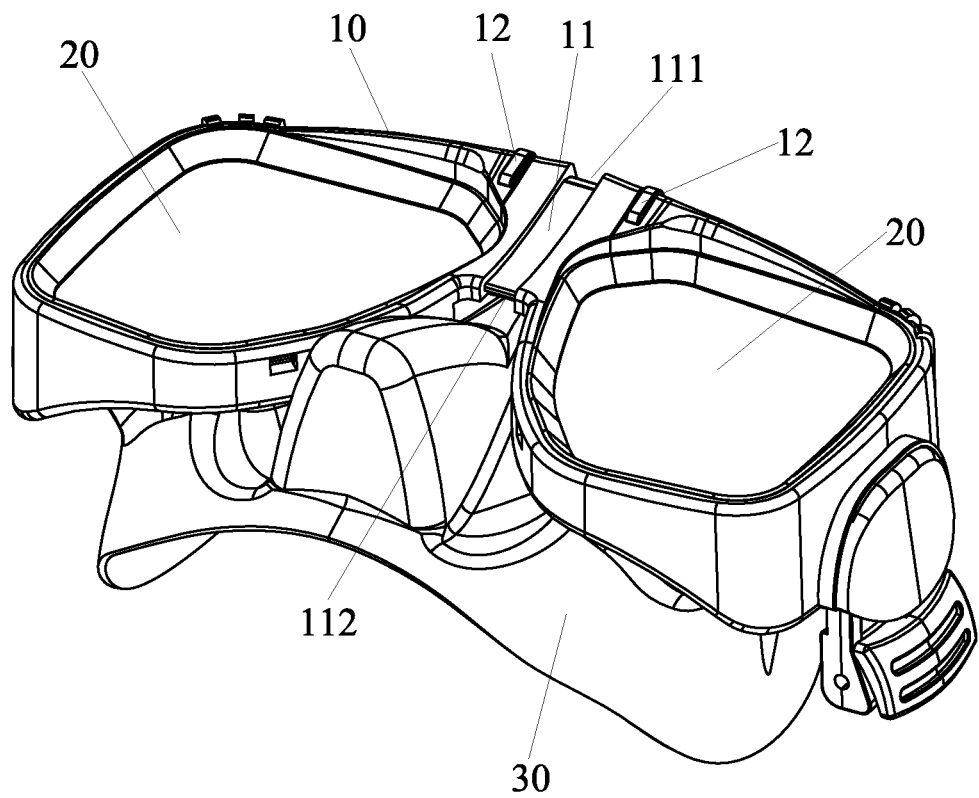
FIG. 6 is a perspective view of the diving goggles without the camera bracket of the present invention.

As shown in FIG. 1 to FIG. 6, diving goggles having a detachable camera bracket according to an embodiment of the present invention comprises a frame 10, a pair of lenses 20, and a mask 30 for attaching to a wearer's face.

The lenses 20 are mounted to an outer side of the frame 10. The mask 30 is mounted to an inner side of the frame 10. A camera bracket 40 is detachably mounted on the frame 10 for retaining a camera. The camera bracket 40 includes a coupling seat 41 for coupling with the frame 10 and a retaining seat 42 on top of the coupling seat 41 for retaining the camera. The coupling seat 41 includes a top plate 411 and a side plate 412 extending downward from a rear side of the top plate 411. A front end of the top plate 411 is bent downward to form a limit block 4111. A retaining space 413 is defined between the limit block 4111 and the side plate 412 for retaining an upper edge of the frame 10. The coupling seat 41 is provided with a rib 414 extending downward from a lower surface of the top plate 411 to a lower end of the side plate 412. An upper end of the rib 414 is formed with an engaging buckle 4141. A lower end of the rib 414 is formed with an L-shaped hook 4142. The frame 10 has a groove 11 corresponding to the rib 414. The groove 11 extends downward from the upper edge of the frame 10 to a front side wall of the frame 10. An upper end of the groove 11 is formed with an engaging recess 111 corresponding to the engaging buckle 4141. A lower end of the groove 11 is formed with an upright recess 112 corresponding to the hook 4142. The rib 414 is engaged in the groove 11. The engaging buckle 4141 is engaged with the engaging recess 111. The hook 4142 is engaged with the upright recess 112.

In addition, an inner wall of the retaining space 413 is formed with two positioning grooves 4131. The two positioning grooves 4131 are located at two sides of the engaging buckle 4141, extending from the lower surface of the top plate 411 to an inner wall of the side plate 412. An outer wall of the frame 10 is provided with two positioning ribs 12 corresponding to the two positioning grooves 4131. The positioning ribs 12 corresponding to the positioning groves 4131 extend downward from the upper edge of the frame 10 to the front side wall of the frame 10. The positioning ribs 12 are engaged in the positioning grooves 4131.

The retaining seat 42 includes a plurality of support plates 421 which are vertically arranged side by side and disposed on an upper surface of the top plate 411. The support plates 421 each have a retaining through hole 422 therein.

The feature of this invention is that the camera bracket is detachably mounted on the frame of the diving goggles, and the lower end of the camera bracket is secured to the frame by means of clipping and hooking, and the upper end of the camera bracket is provided with the retaining seat for mounting the camera. The camera bracket connects the camera with the frame stably, effectively preventing the camera from shaking during diving. Thus, during diving, the diver can take a picture for the underwater scenery very conveniently. Diving and photographing can be achieved at the same time. The camera bracket can be removed conveniently when it is necessary to take a picture. The present invention enhances the diving entertainment.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. Diving goggles having a detachable camera bracket, comprising:

a frame;
a pair of lenses; and
a mask for attaching to a wearer's face;
wherein the lenses are mounted to an outer side of the frame, the mask being mounted to an inner side of the frame, the camera bracket being detachably mounted on the frame for retaining a camera; the camera bracket including a coupling seat for coupling with the frame and a retaining seat on top of the coupling seat for retaining the camera, the coupling seat including a top plate and a side plate extending downward from a rear side of the top plate, a front end of the top plate being bent downward to form a limit block, a retaining space being defined between the limit block and the side plate for retaining an upper edge of the frame; a lower surface of the top plate being provided with an engaging buckle facing downward, a lower end of the side plate being provided with a L-shaped hook; the upper edge of the frame having an engaging recess corresponding to the engaging buckle, a front side wall of the frame having an upright recess corresponding to the hook, the engaging buckle being engaged with the engaging recess, the hook being engaged with the upright recess; the coupling seat being provided with a rib extending downward from the lower surface of the top plate to the lower end of the side plate, the engaging buckle being disposed at an upper end of the rib, the hook being disposed at a lower end of the rib, the frame having a groove corresponding to the rib, the rib being engaged in the groove, the engaging recess being disposed at an upper end of the groove, and the upright recess being disposed at a lower end of the groove.

2. The diving goggles having a detachable camera bracket as claimed in claim 1, wherein an inner wall of the retaining space is formed with a positioning groove, an outer wall of the frame is provided with a positioning rib corresponding to the positioning groove, and the positioning rib is engaged in the positioning groove.

3. The diving goggles having a detachable camera bracket as claimed in claim 2, wherein the inner wall of the retaining space is formed with two positioning grooves, the two positioning grooves are located at two sides of the engaging buckle and extend from the lower surface of the top plate to an inner wall of the side plate, the frame is provided with two positioning ribs corresponding to the two positioning grooves and extending downward from the upper edge of the frame to the front side wall of the frame.

4. The diving goggles having a detachable camera bracket as claimed in claim 1, wherein the retaining seat includes a plurality of support plates which are vertically arranged side by side and disposed on an outer wall of the top plate, and the support plates each have a retaining through hole therein.

5. The diving goggles having a detachable camera bracket as claimed in claim 4, wherein the plurality of support plates are integrally disposed on an upper surface of the top plate.

* * * * *